United States Patent
Tezza, II et al.

(10) Patent No.: US 11,572,006 B2
(45) Date of Patent: Feb. 7, 2023

(54) VEHICLE WITH A SLIDE-UP ROOF

(71) Applicant: WEBTEZ, INC., Oxnard, CA (US)

(72) Inventors: Peter J. Tezza, II, Oxnard, CA (US); Michael Brian Pohmisano, Oxnard, CA (US)

( * ) Notice: Subject to any disclaimer, the term of this patent is extended or adjusted under 35 U.S.C. 154(b) by 203 days.

(21) Appl. No.: 15/929,879

(22) Filed: May 27, 2020

(65) Prior Publication Data
US 2020/0377001 A1 Dec. 3, 2020

Related U.S. Application Data

(60) Provisional application No. 62/856,054, filed on Jun. 1, 2019.

(51) Int. Cl.
*B60P 3/34* (2006.01)

(52) U.S. Cl.
CPC ................... *B60P 3/341* (2013.01)

(58) Field of Classification Search
CPC ... B60P 3/34; B60P 3/341; B60P 3/343; B60J 7/165
USPC .............................. 296/165, 26.07
See application file for complete search history.

(56) References Cited

U.S. PATENT DOCUMENTS

| | | | | |
|---|---|---|---|---|
| 1,935,993 A * | 11/1933 | Reutter | ................... | B60J 7/165 296/26.05 |
| 2,729,497 A * | 1/1956 | Runyan | ................... | B60P 3/34 296/171 |
| 3,649,073 A * | 3/1972 | Whittemore | ........... | B60J 7/1614 296/100.08 |
| 3,770,314 A * | 11/1973 | Borskey | .................... | B60J 7/165 296/176 |
| 4,362,258 A * | 12/1982 | French | ..................... | B60J 7/165 224/309 |
| 5,078,441 A * | 1/1992 | Borskey | .................... | B60J 7/165 292/DIG. 72 |
| 6,126,220 A * | 10/2000 | Brasher | ................... | B60P 1/286 296/26.04 |
| 6,325,447 B1 * | 12/2001 | Kuo | ........................ | B60P 3/341 296/160 |

FOREIGN PATENT DOCUMENTS

| | | | | | |
|---|---|---|---|---|---|
| CN | 2441673 Y | * | 8/2001 | | |
| CN | 109334548 A | * | 2/2019 | | |
| DE | 10140272 A1 | * | 7/2003 | ................ | B60P 3/34 |

* cited by examiner

*Primary Examiner* — D Glenn Dayoan
*Assistant Examiner* — Kevin P Weldon
(74) *Attorney, Agent, or Firm* — David Michie (57) ABSTRACT

A vehicle slide-up to increase interior space within a vehicle, the vehicle slide-up comprising: a vehicle roof with an aperture; a lift-up roof that covers the aperture; a support portion for raising and lowering the lift-up roof, the support portion comprising: an upper pair of rails and a lower pair of rails; a plurality of support mechanisms; and at least one lift mechanism; a plurality of slide-up walls, wherein a top portion of the plurality of slide-up walls is attached to an underside of the lift-up roof and a bottom portion of the plurality of slide-up walls is attached to a rim of the aperture; wherein the support portion is positioned outside of the plurality of slide-up walls. Wherein the lift-up roof is comprise of a first layer, a second layer, and a core; wherein the core is sandwiched between the first and second layers.

20 Claims, 5 Drawing Sheets

VEHICLE WITH A SLIDE-UP ROOF

CROSS-REFERENCE TO RELATED APPLICATIONS

This application is a non-provisional of, and claims the benefit of priority from, U.S. Provisional Patent Application No. 62/856,054 filed Jun. 1, 2019.

FEDERALLY SPONSORED RESEARCH

Not Applicable

FIELD OF INVENTION

This invention relates to a slide-up roof for a vehicle, more particularly, to slide-up roofs for vehicles such as vans, camper vans, and recreational vehicles (RVs).

BACKGROUND

Slide-outs and slide-ups are used on vehicles, such as vans, camper vans, and Recreational Vehicles (RVs), to increase a vehicle's interior volume while maintaining a smaller exterior volume or profile when the vehicle is in motion. Increased interior volume provides additional capacity and comfort for an occupant. Smaller exterior volume and profiles can improve gas mileage, driving quality, and allow the vehicle to meet both vehicle manufacture specifications for weight distribution and government regulations.

Existing slide-up roof designs have the following drawbacks: small interior volumes, small lift capacities, lift mechanism that intrudes into the interior volume, poor stability, and required manual operation to lift the slide-up roof. Additionally, existing slide-up roofs suffer from multiple single points of failure and there is a need for a vehicle slide-up roof with improved structural integrity. There is also a need for a vehicle slide-up roof that provides an increased interior ceiling height and interior width when the vehicle is at rest, while retaining a lower height when the vehicle is in motion.

BRIEF SUMMARY OF THE INVENTION

A vehicle slide-up to increase interior space within a vehicle, the vehicle slide-up comprising: a vehicle roof with an aperture; a lift-up roof that covers the aperture; a support portion for raising and lowering the lift-up roof, the support portion comprising: an upper pair of rails and a lower pair of rails; a plurality of support mechanisms; and at least one lift mechanism; a plurality of slide-up walls, wherein a top portion of the plurality of slide-up walls is attached to an underside of the lift-up roof and a bottom portion of the plurality of slide-up walls is attached to a rim of the aperture; wherein the support portion is positioned outside of the plurality of slide-up walls. Wherein the lift-up roof is comprise of a first layer, a second layer, and a core; wherein the core is sandwiched between the first and second layers; wherein the core extends to the perimeter of a top surface of the lift-up roof.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art.

Figure 1A:
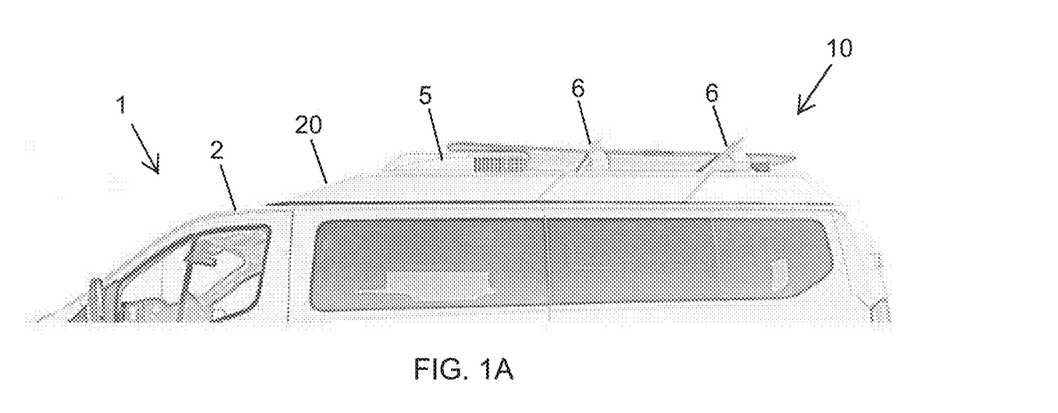
FIG. 1A is a side facing view of a vehicle slide-up in a closed position.

Referring to FIG. 1A, in most embodiments, a vehicle 1 may have a slide-up 10 on top of a vehicle roof 2 that completely covers an aperture 15, not shown, when the slide-up 10 may be in a closed position. The vehicle 1 may be a van, a camper van, or a Recreational Vehicle (RV). In most embodiment, the aperture 15 may be substantially rectangular shaped and positioned in a centralized location on the vehicle roof 2. In most embodiments, the aperture 15 may be created by removing a portion of the vehicle roof 2 along with a portion of a vehicle roof frame 3, the removed portions may be referred to as a core 100, explained in more detail below.

In some embodiments, the vehicle roof frame 3 is comprised of a plurality of first frame members 4a and a plurality of second frame members 4b that may be perpendicular to the plurality of first frame members 4a. In some embodiments, the plurality of first and second frame members 4a, 4b may be added to the perimeter of the aperture 15 to increase structural integrity of the vehicle roof 2. The additional plurality of first and second vehicle frame members 4a, 4b may be attached to the vehicle frame 3. In a non-limiting example, after forming the aperture 15, the additional plurality of first and second vehicle members 4a, 4b may be attached to the vehicle frame 3 around the perimeter of the aperture 15, which may act as a rim 17 of the aperture 15.

Figure 1B:
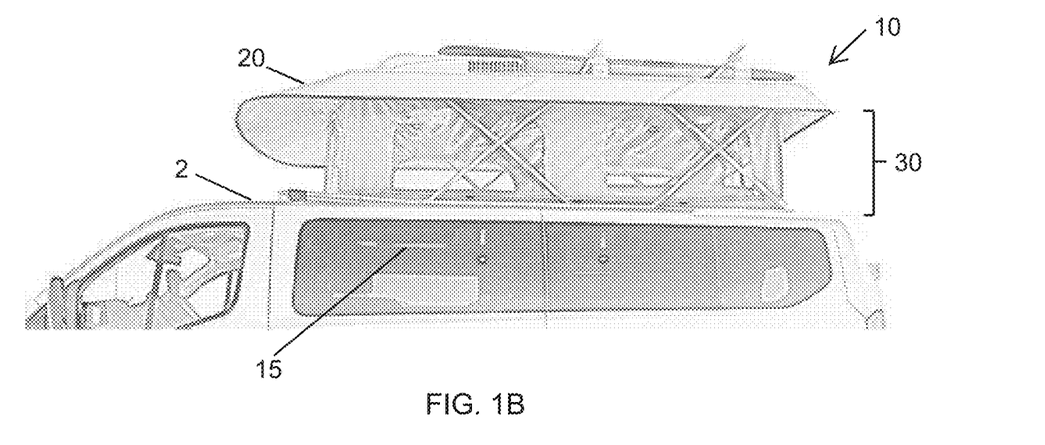
FIG. 1B is a side facing view of the vehicle-slide up in an opened position.

In most embodiments, the slide-up 10 may comprise a lift-up roof 20 and a support portion 30 as seen when the slide-up 10 may be in an opened position as shown in FIG. 1B. In some embodiments, a vehicle heating ventilation and air conditioner (HVAC) unit 5 and/or a vehicle storage racks 6 may be attached to the slide-up 10 as seen in FIG. 1A. In some embodiments, the HVAC unit 5 and/or storage racks 6 may be secured to the lift-up roof 20. In a non-limiting example, the HVAC unit 5 and/or storage racks 6 may be secured about a center region of a top surface of the lift-up roof 20 to maintain a centralized weight distribution. However, the above position of the HVAC unit 5 and/or storage racks 6 may be placed in any reasonable position on the lift-up roof 20.

Figure 3:
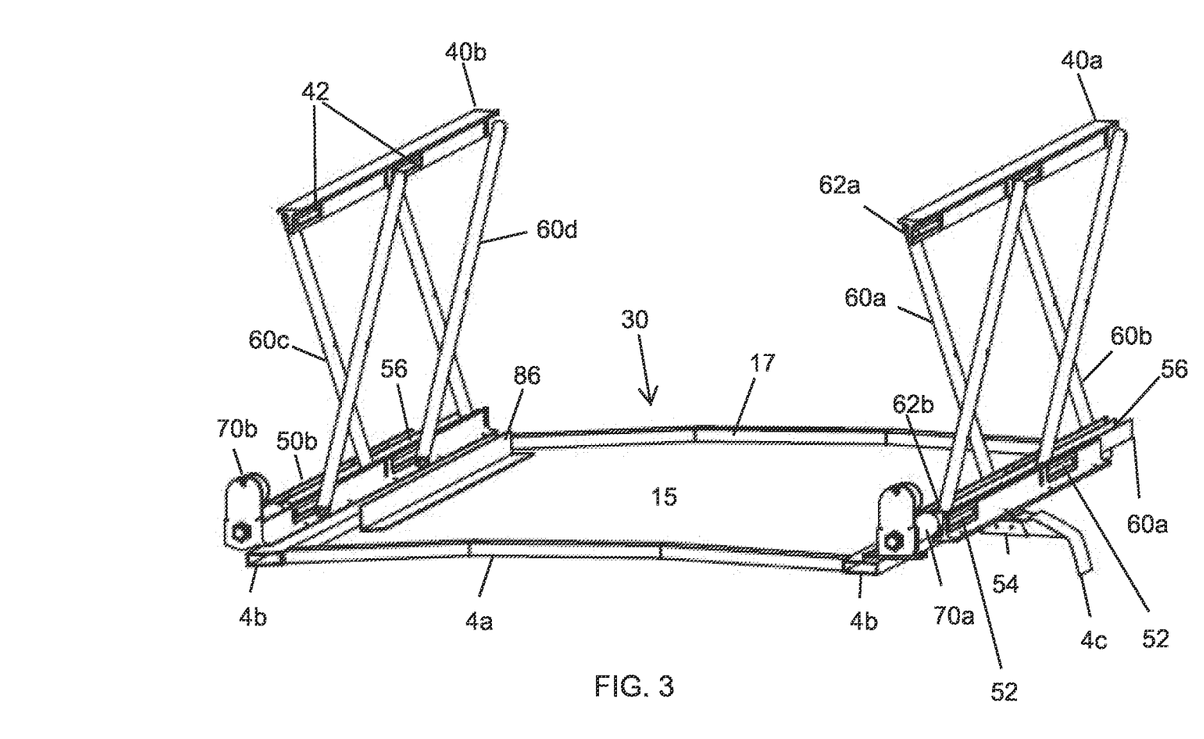
FIG. 3 is a perspective view of the support portion of the vehicle slide-up.

In most embodiments, FIG. 3 illustrates the support portion 30 that may comprise a upper pair of rails 40, a lower pair of rails 50, a plurality of support mechanisms 60, and a plurality of lift mechanisms 70. The upper pair of rails 40 may be attached to a bottom surface of the lift-up roof 20 that may be parallel to the top surface of the lift-up roof 20.

The lower pair of rails 50 may be attached to the vehicle roof 2 outside a perimeter of the aperture 15.

In most embodiments, the lower pair of rails 50 may also be attached to the vehicle roof frame 3 that may be embedded in the vehicle roof 2. In some embodiments, the lower pair of rails 50 may be attached to at least one of the plurality of first frame members 4a and the plurality of second frame members 4b of the vehicle roof frame 3, or both. In most embodiments, the upper pair of rails 40 and the lower pair of rails 50 may be aligned.

As seen in FIG. 3, first ends 62a of the plurality of support mechanisms 60 may be attached to the upper pair of rails 40 and second ends 62b of the support mechanisms 60 may be attached to the lower pair of rails 50. In most embodiments, the upper and lower pair of rails 40, 50 may have sliding slots 42, 52. The first ends 62a of the plurality of support mechanisms 60 may be attached to the sliding slots 42, which may allow the first ends 62a to move in a horizontal direction along their respective rails. The second ends 62b of the plurality of support mechanisms 60 may also be attached to the sliding slots 52, which may also allow the second ends 62b to move in a horizontal direction along their respective rails.

Figure 2:
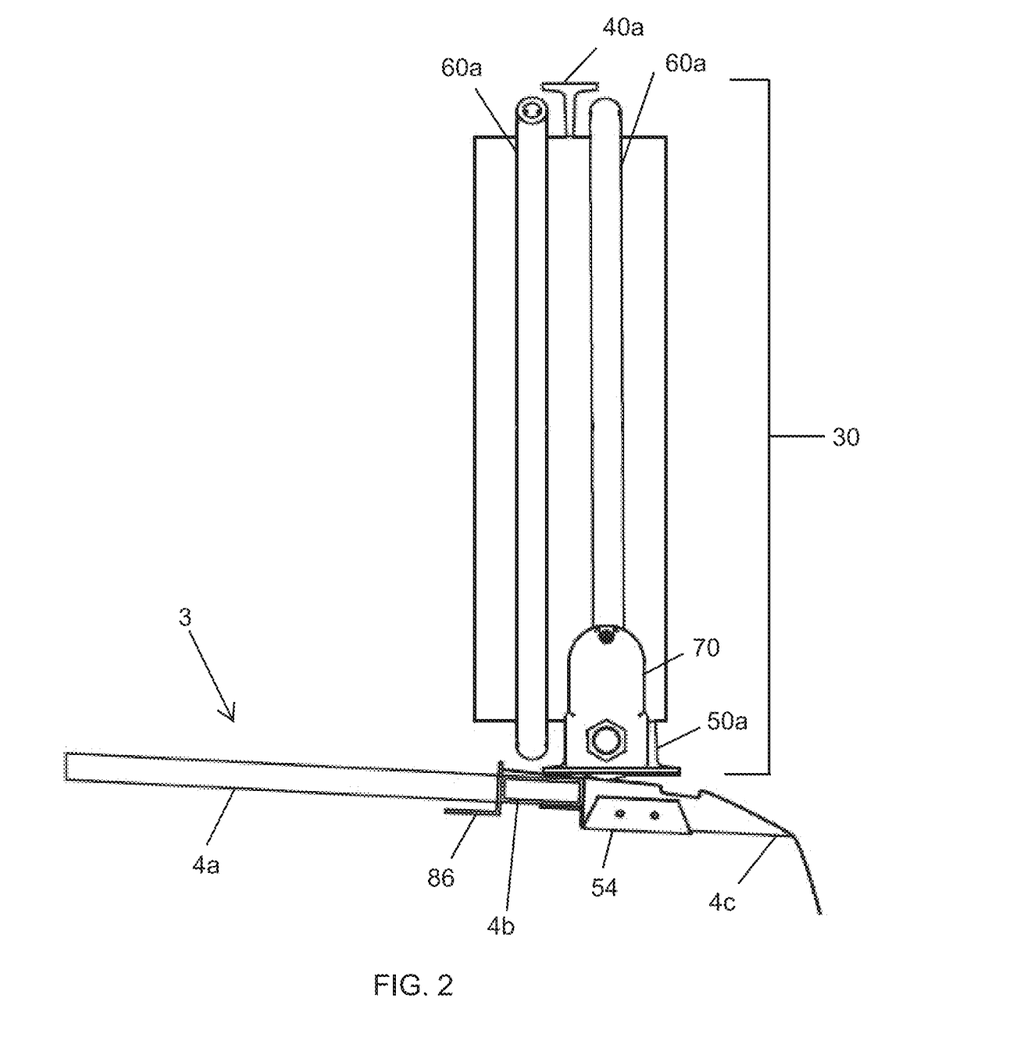
FIG. 2 is a front view of a support portion of the vehicle slide-up.

In some embodiments, the lower pair of rails 50 may also be attached to a pillar bracket 54, as shown in FIGS. 2-3. The pillar bracket 54 may increase stability of the support portion 30 by increasing resistance to external forces when the slide-up 20 may be lifted or in the opened position. In most embodiments, the pillar bracket 54 may be secured to one of the plurality of first and second vehicle frame members 4a, 4b. In a non-limiting example, the pillar bracket is attached to one of the plurality of first vehicle frame members 4a and an existing vehicle support pillar 4c as seen in FIG. 3. The pillar bracket 54 may also increase the integrity of the vehicle roof frame 3 and the vehicle roof 2.

Figure 4:
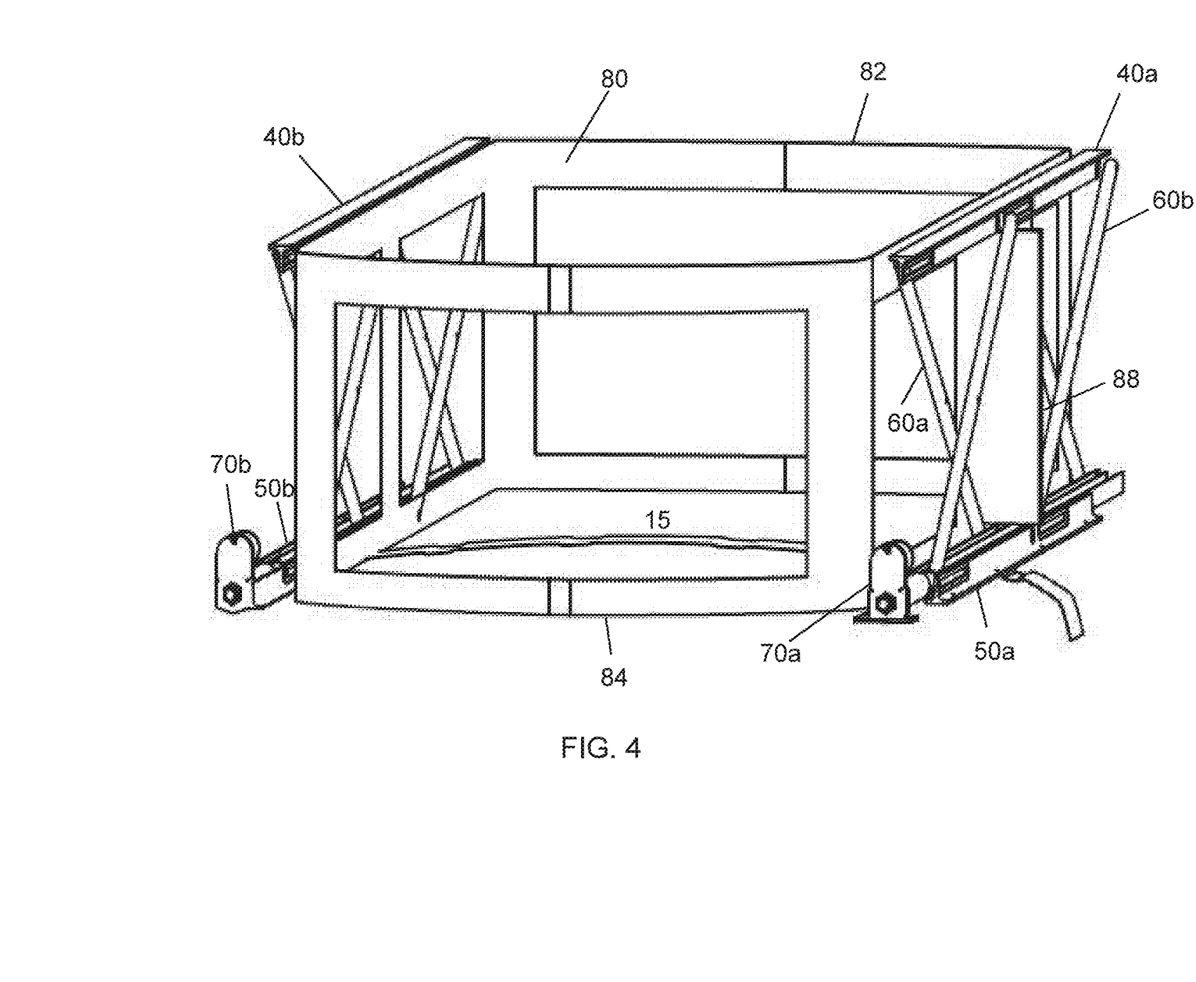
FIG. 4 is a perspective view of the support portion and slide-up walls of the vehicle slide-up.

Now referring to FIGS. 3-4, in most embodiments, the plurality of support mechanisms 60 comprise a plurality of paired support members 60a-d. The plurality of paired support members 60a-d may comprise of a plurality of scissor mechanisms, which may increase weight capacity and stability of the slide-up 10. In a preferred embodiment, the plurality of support mechanisms 60 comprise of four or more scissor mechanisms, as seen in FIG. 3. In most embodiments, the plurality of scissor mechanisms may be raised into a vertical support position, as shown in FIGS. 1B and 3, when a horizontal force is applied to the second ends 62b of the plurality of support mechanism 60. When the horizontal force is reversed, the vertical support position of the plurality of support mechanisms 60 reverts to a horizontal support position. In most embodiments, the plurality of support mechanisms 60 in the horizontal support position may be covered by the lift-up roof 20 when in the closed position as seen in FIG. 1A.

In some embodiments, the plurality of lifting mechanisms 70 may apply a sealing force to the plurality of support mechanisms 60 that may cause the plurality of support mechanisms 60 in the horizontal support position to transfer a slight downwards force to the lift-up roof 20. The slight downwards force of the lift-up roof 20 may cause a gasket around a perimeter of the lift-up roof 20 to compress and seal against the vehicle roof 2, which would prevent water or other fluids from entering the slide-up 10 while the vehicle may be moving or stored.

Now referring to FIGS. 3-4, in most embodiments one or more of the plurality of lift mechanism 70 may be attached to the lower pair of rails 50. In a non-limiting example, a first lift mechanism 70a is attached to a single lower rail 50a and a second lift mechanism 70b may be attached to a second single lower rail 50b. In another example, only the first lift mechanism 70a may be attached to the single lower rail 50a, while no lift mechanism 70 may be attached to the second lift mechanism 70b. In some embodiments, the plurality of lift mechanism 70 may be attached to the vehicle roof 2 or the lift-up roof 20.

In a preferred embodiment, the plurality of lift mechanisms 70 may be linear actuators. In other embodiments, the plurality of lift mechanisms may be electromagnet solenoid pistons, hydraulic actuators, pneumatic actuators, etc. In most embodiments, the plurality of lift mechanisms 70 may be powered by at least one of a vehicle battery, disposable batteries, solar power, and power generated from a vehicle engine, or a combination thereof.

In most embodiments, the plurality of lift mechanisms 70 may apply a horizontal force on the second ends 62b of the support mechanisms 60 along guiding slots 56. Referring back to the non-limiting example above, the first lift mechanism 70a and the second lift mechanism 70b, both of which are linear actuators, may synchronously apply a horizontal force to each second end 62b within the respective guiding slots 56 which may cause the support mechanism 60 to apply a vertical force to the lift-up roof 20. The vertical force may raise the lift-up roof 20. If the first and second lift mechanisms 70a, 70b reverse the horizontal force to each second end 62b, then the weight of the lift-up roof 20 may cause a downwards force on the support mechanisms 60, effectively lowering the lift-up roof 20 back on to the vehicle roof 2.

In most embodiments, the plurality of lift mechanisms 70 may be rated to lift additional storage weight beyond a combined weight of the lift-up roof 20 and the support portion 30, such as the HVAC unit 5, the storage racks 6, and any additional storage containers. In most embodiments, the plurality of support mechanisms 30, which may be made from a high impact plastic, a metal, an alloy, or a combination thereof, may also be rated to support the additional storage weight.

In a preferred embodiment, the plurality of lift mechanisms 70 may be rated to lift an additional one hundred pounds beyond the combined weight of the lift-up roof 20, the support portion 30, the HVAC unit 5, and the storage racks 6. The additional storage weight outside of the vehicle 1 may allow for more interior space within the vehicle 1. Additionally, the additional storage weight may reduce a need for excessive unloading before the slide-up 10 may be placed in the opened position. Another benefit of the additional storage weight may be that the lift-up roof 20 may act as a safety storage, such as placing food out of reach of wild animals when camping.

In most embodiments, the plurality of lift mechanisms 70 may be activated by a switch 72, not shown. The switch 72 may be mounted within the interior volume of the vehicle 1, such as on a dashboard, a console, at least one interior wall, a ceiling, or the perimeter of the aperture 15 or the rim 17 of the vehicle 1, or a combination thereof. In a non-limiting example, a user may be able to operate the plurality of lift mechanisms 70 from a first switch 72a on the dashboard and also from a second switch switch 72b located on a rear interior wall of the vehicle 1. In some embodiments, the switch 72 may be a remote switch 74. In another non-limiting example, the plurality of lifting mechanisms 70 may be connected via a wireless transmitter, using Bluetooth, radio broadcast (RF), infrared (IR), microwave, etc., to the dashboard of the vehicle 1 or directly to a computer device, such as a key fob, a smartphone, a tablet, etc.

In some embodiments, a plurality of sensors 76 may be attached to the plurality of lift mechanisms 70. The plurality of sensors 76 may be use to determine the weight of the slide-up 10, including the additional storage weight and/or operational status of the plurality of lift mechanisms 70. In some embodiments, data from the plurality of sensors 76 may be processed by a central computer of the vehicle 1 and displayed on the dashboard or a display device combined with the switch 72. In some embodiments, the data may be transmitted by the wireless transmitter, using Bluetooth, radio broadcast (RF), infrared (IR), microwave, etc., to the computer device, such as a key fob, a smartphone, a tablet, etc. The data may be displayed as a light indicating a weight range or may be displayed as an actual number on a display screen. For example, an LED on the key fob may be green when illuminated to indicate that the slide-up 10 and additional weight may be within an acceptable range or may be red when illuminated to indicate that the slide-up 10 and additional weight may be outside of the weight range. In another non-limiting example, the plurality of sensors 76 may display on an LCD or LED screen the data regarding a weight distribution of the slide-up 10 with and without the additional storage weight.

In most embodiments, slide-up walls 80 may have an upper end 82 and a lower end 84 that may respectively be attached to the bottom surface of the lift-up roof 20 and an interior facing surface of the aperture 15 or the rim 17. In other embodiments, the lower end 84 of the slide-up walls 80 may be attached to the vehicle roof 2 around the perimeter of the aperture 15, which would prevent water or fluid from entering the interior of the vehicle 1. In other embodiments, the lower end 84 of the slide-up walls 80 may have a wall gasket that seals the lower end 84 to the vehicle roof 2 around the perimeter of the aperture 15. In most embodiments, the slide-up walls 80 may be foldable with an accordion shape or other fold styles to improve storage of the slide-up walls 80 when the slide-up 10 may be in a closed position. In other embodiments, one or more sides of the slide-up walls 80 may be removable for storing in a separate storage container or the interior of the vehicle 1. In most embodiments, the slide-up walls 80 may be made from plastic or fabric materials.

In most embodiments, the slide-up walls 80 may have a plurality of windows and vents to allow in light or fresh air. In most embodiments, the support portion 30 of the slide-up 10 may be positioned outside of the slide-up walls 80, thus increasing usable interior space within the vehicle 1. In some embodiments, slide-up wall panel support rails 86 may be attached to the interior facing surface of the aperture 15 or the rim 17, as shown in FIGS. 2-3, to support the folded slide-up walls 80 when the slide-up 10 may be in the closed position. In some embodiments, the slide-up panel support rails 86 may be used to support a bed panel for a bed when the slide-up 10 may be in the opened position.

In most embodiments, the slide-up 10 may be serviced in the field using standard tools. In most embodiments, the slide-up 10 may have a temporary support 88, as seen in FIG. 4. The temporary support 88 may fit between at least one of the upper rails 40 and at least one of the lower rails 50, respectively to maintain the slide-up 10 in the open positioned. In some embodiments, the temporary support 88 may fit in one of a plurality of grooves 48, 58 positioned along the upper and lower pairs of rails 40, 50. The user may use the temporary support 88 to reduce the weight on one side of the plurality of support mechanisms 60 while operating on the slide-up 10 so that at least one of the mechanisms 60 may be removed with ease.

In most embodiments, the slide-up 10 may still operate with a failure of any one of the plurality of support mechanisms 60. The plurality of support mechanisms 60 may act as built in redundancies so the user may reasonably continue to use the slide-up 10 before being serviced. In a non-limiting example, if one aspect of the plurality of support mechanisms 60 fails while camping away from town, the user may simple remove the broken support mechanism and may continue to use the slide-up 10 for a reasonable amount of time before the broken part can be replaced. This way the user can still enjoy the use of the slide-up 10 during their trip or vacation.

Figure 5:
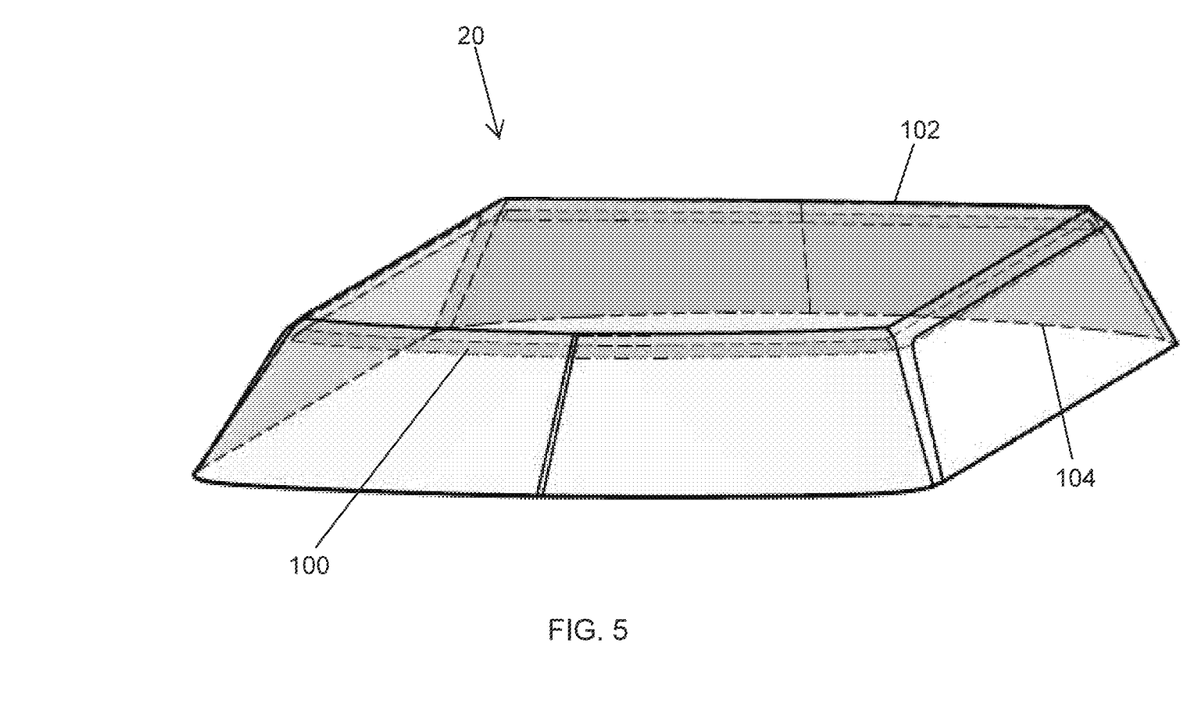
FIG. 5 is a perspective view of a lift-up roof of the vehicle slide-up.

Now referring to FIG. 5, in most embodiments, the lift-up roof 20 may include the core 100, which may be made from a portion of vehicle roof 2 that may be removed from the aperture 15. In some embodiments, the core 100 may extend beyond the rim 17 of the aperture 15, where the rim 17 comprises additional frame members 4a, 4b around the perimeter of the aperture.

In most embodiments, the core 100 of the lift-up roof 20 may be sandwiched between a first layer 102 and a second layer 104 of weatherproof material, such as fabrics, metals, plastics, nylon, PVC, polyethylene, or a combination thereof. In most embodiments, the first and second layers 102, 104 may form a three-dimensional shape as depicted in FIG. 5 that shows the lift-up roof 20. In other embodiments, the first and second layers 102, 104 may form any three-dimensional shape that may be able to cover the aperture 15, the support portion 30, and slide-up walls 80 while in the closed position.

In most embodiments, a method to manufacturing the slide-up 10 may start by separately manufacturing the first and second layers 102, 104 of the lift-up roof 20. In some embodiments, a space may be carved out from each of the first and second layers 102, 104 before being sandwiched. The space may be carved from a bottom surface of the first layer 102 and a top surface of the second layer 104, which may connect the respective spaces when sandwiched. In most embodiments, the space may extend to a plurality of edges along a top surface of the lift-up roof 20. The core 100 may then be placed in the space, then the first and second layers 102, 104 may be sandwiched and sealed.

In most embodiments, by placing the core 100 in the space that may extend to the plurality of edges along the top surface of the lift-up roof 20, the slide-up 20 may have increased structural integrity due to engineered properties of the core 100, which may have originally been a portion of the vehicle roof 2. In most embodiments, the core 100 may allow for a wider width of the lift-up roof 20. The upper pair of rails 40 may be attached to the perimeter of the core 100, which may be stronger than the sandwiched first and second layers 102, 104. The upper pair of rails 40 that may be attached to the perimeter of the core 100 may align with the lower pair of rails attached to the rim 17 of the aperture 15, where the rim 17 comprises additional frame members 4a, 4b around the perimeter of the aperture. This allows for substantially all of the aperture 15 to be included in an interior volume of the vehicle 1.

Additionally, the wider width of the lift-up roof 20 may allow for a wider distance between the upper pair of rails 40 and subsequently the lower pair of rails. In some embodiments, the wider distance may allow the support portion 30 to be positioned outside of the aperture 15 and the slide-up walls 80, which may prevent the support portion 30 from interfering with the user while using the slide-up 10. In most embodiments, the lift-up roof 20 with the core 100 may increase resistance to crushing during a roll over event or accident because of the engineered properties of the core 100, the first and second layers 102, 104 reinforcing the core 100, and the the support portion 30 connecting the core 100 to the vehicle roof 2. The slide-up 10 with the core 100 may meet government and manufacture guidelines regarding crush test.

In some embodiments, the core 100 and the first and second layer 102, 104 of the lift-up roof 20 may have a plurality of aligned holes 108, not shown, which may be used to secure the HVAC unit 5, the storage racks 6, and the upper pair of rails. The plurality of holes 108 may be of various sizes to fit fasteners, such as screws and bolts, or to fit ventilation components, such as ducts and tubing. In some embodiments, at least one of the plurality of holes 108 may be large enough to fit the HVAC unit 5.

In most embodiments, standard maintenance of the slide-up 10 may be completed with standard tools known by one reasonably skilled in the art. In most embodiments, the slide-up 10 and associated parts may be attached to other parts or to the vehicle 1 with fasteners, which may be any fastener known by one reasonably skill in the art. In some embodiments, the slide-up 10 and associated parts may be attached by permanent fasteners, such as rivets, welding, and adhesives, or a combination of permanent and non-permanent fasteners.

In particular, with respect to the above description, it is to be realized that the optimum dimensional relation ships for the parts of the present invention may include variations in size, materials, shape, form, function and manner of operation. The assembly and use of the present invention are deemed readily apparent and obvious to one skilled in the art.

The invention claimed is:

1. A vehicle slide-up to increase interior space within a vehicle, the vehicle slide-up comprising:
    a vehicle roof with an aperture;
    a lift-up roof that covers the aperture; wherein the lift-up roof is comprise of a first layer, a second layer, and a core; wherein the core is sandwiched between the first and second layers; wherein the core extends to the perimeter of a top surface of the lift-up roof;
    a support portion for raising and lowering the lift-up roof, the support portion comprising:
        a upper pair of rails and a lower pair of rails;
        a plurality of support mechanisms; and
        at least one lift mechanism;
    a plurality of slide-up walls, wherein a top portion of the plurality of slide-up walls is attached to an underside of the lift-up roof and a bottom portion of the plurality of slide-up walls is attached to a rim of the aperture;
    wherein the support portion is positioned outside of the plurality of slide-up walls.

2. The vehicle slide-up of claim 1, wherein the plurality of support mechanisms comprise four pairs of scissor mechanisms, wherein each pair of scissor mechanisms have a set of first ends connected to the upper pair of rails and a set of second ends connected to the lower pair of rails.

3. The vehicle slide-up of claim 2, wherein the upper pair of rails have a plurality of upper slots and the lower pair of rails have a plurality of lower slots; wherein one of a first end of the set of first ends are attached to a separate upper slot of the plurality of upper slots; wherein one of a second end of the set of second ends are attached to a separate lower slot of the plurality of lower slots; wherein the first end of the set of first ends can slide along the separate upper slot and the second end of the set of second ends can slide along the separate lower slot.

4. The vehicle slide-up of claim 3, wherein the at least one lift mechanism causes an applied horizontal force to the set of second ends of at least one of the pairs of scissor mechanisms; wherein the applied horizontal force causes the set of second ends of the pair of scissor mechanism to fold towards each other into a vertical oriented position that raises the lift-up roof.

5. The vehicle slide-up of claim 3, wherein the at least one lift mechanism causes a reverse horizontal force to the set of second ends of at least one of the pairs of scissor mechanisms; wherein when the reverse horizontal force causes the set of second ends of the pair of scissor mechanism to fold away from each other into a horizontal oriented position that lowers the lift-up roof.

6. The vehicle slide-up of claim 1, wherein the upper pair of rails is attached to the underside of the lift-up roof; wherein the lower pair of rails is attached to the vehicle roof.

7. The vehicle slide-up of claim 1, further comprising a plurality of frame members; wherein the vehicle roof further comprises a vehicle roof frame; wherein the plurality of frame members are attachable to the vehicle roof frame around the aperture; wherein the plurality of frame members form the rim around the aperture.

8. The vehicle slide-up of claim 7, wherein the plurality of frame members are secured to a plurality of vehicle support pillars by support brackets.

9. The vehicle slide-up of claim 8, wherein the lower pair of rails are attachable to at least one of the vehicle roof frame, the additional frame members, and the support brackets.

10. The vehicle slide-up of claim 1, wherein the at least one lift mechanism is a linear actuator.

11. The vehicle slide-up of claim 1, further comprising: a switch positioned in the interior of the vehicle; wherein the switch controls one of the at least one lift mechanisms.

12. The vehicle slide-up of claim 1, wherein the upper pair of rails are respectively attached to opposing sides of the outer perimeter of the core; wherein the upper pair of rails attached to the opposing sides of the outer perimeter are on the underside of the lift-up roof.

13. The vehicle slide-up of claim 1, wherein the core is made from a cut out portion of the vehicle roof; wherein a size of the core is substantially similar to a size of the aperture.

14. The vehicle slide-up of claim 13, where the lift-up roof and the core have a roof crush resistance when the slide-up is in the closed position.

15. The vehicle slide-up of claim 1, wherein the lift-up roof covers the support portion in a closed position.

16. The vehicle slide-up of claim 1, wherein the at least one lifting mechanism can lift an additional amount of weight over a combined weight of the lift-up roof and the support portion; wherein the support portion is able to support the additional amount of weight.

17. The vehicle slide-up of claim 16, wherein the support portion supports the lift-up roof and at least one of a heating ventilation air conditioning (HVAC) unit, one or more storage racks, and one or more storage containers.

18. A reinforced vehicle slide-up to increase interior space within a vehicle, the reinforced vehicle slide-up comprising:
    a vehicle roof with an aperture; wherein a plurality of frame members are attached to a perimeter of the aperture;
    a lift-up roof that covers the aperture, wherein the lift-up roof contains a core layer cut from the vehicle roof;
    a support portion for raising and lowering the lift-up roof, the support portion comprising:

a upper pair of rails substantially attached to an outer perimeter of the core layer of the lift-up roof;

a lower pair of rails attached to the additional frame members that are attached around the perimeter of the aperture;

a plurality of support mechanisms connecting the upper pair of rails to the lower pair of rails; and at least one lift mechanism attached to the lower pair of rails;

a plurality of slide-up walls, wherein a top portion of the plurality of slide-up walls is attached to an underside of the lift-up roof and a bottom portion of the plurality of slide-up walls is attached to the vehicle roof;

wherein the support portion is positioned outside of the plurality of slide-up walls; wherein the support portion is completely covered by the lift-up roof when the vehicle-slide is in a closed position.

19. A method for constructing a vehicle slide-up, the method comprising:

construction a lift-up roof, the lift-up roof comprising:
cutting a core from a portion of a vehicle roof;
manufacturing a first layer and a second layer separately, wherein a bottom surface of the first layer contains a first carve out and a top surface of the second layer contains a second carve out, wherein both the first and second carve outs extend to the perimeter of the top surface of each first and second layer;

placing the core into the first carve out on the first layer;

sandwiching the second layer with the second carve out over the core and against the first layer;

attaching a support portion to the lift-up roof and the vehicle roof; and attaching a plurality of slide-up walls to the lift-up roof and the vehicle roof; wherein the support portion is positioned outside of the plurality of slide-up walls.

20. The method for constructing a vehicle slide-up of claim 19, wherein the support portion further comprises:

attaching an upper pair of rails to an underside of the lift-up roof along the outer perimeter of the core;

attaching a lower pair of rails to a rim of the aperture, wherein the rim comprises a plurality of frames secured to a vehicle roof around the perimeter of the aperture;

attaching a plurality of support mechanisms to the upper pair of rails and the lower pair of rails;

attaching at least one lifting mechanism to the lower pair of rails, wherein the lift mechanism is connected to a switch.

* * * * *